(12) United States Patent
Bruno et al.

(10) Patent No.: US 7,445,035 B2
(45) Date of Patent: Nov. 4, 2008

(54) PROCESS FOR INITIALIZING A ROLLER SHUTTER

(75) Inventors: Serge Bruno, Marnaz (FR); Anne Bontemps, Mieussy (FR)

(73) Assignee: Somfy SAS, Cluses (FR)

( * ) Notice: Subject to any disclaimer, the term of this patent is extended or adjusted under 35 U.S.C. 154(b) by 396 days.

(21) Appl. No.: 10/919,465

(22) Filed: Aug. 16, 2004

(65) Prior Publication Data

US 2005/0039865 A1 Feb. 24, 2005

(30) Foreign Application Priority Data

Aug. 18, 2003 (FR) .................................. 03 09991

(51) Int. Cl.
*E06B 9/68* (2006.01)
(52) U.S. Cl. ...................... 160/310; 318/466
(58) Field of Classification Search ................ 160/310, 160/84.02, 168.1 P, 188
See application file for complete search history.

(56) References Cited

U.S. PATENT DOCUMENTS 5,467,266 A * 11/1995 Jacobs et al. .................. 700/56
6,082,433 A * 7/2000 Vafaie et al. ................. 160/310
6,497,267 B1 * 12/2002 Azar et al. ................... 160/310

FOREIGN PATENT DOCUMENTS

| EP | 0574637 B1 | 4/1997 |
|---|---|---|
| EP | 1111485 A1 | 6/2001 |
| EP | 1122404 A1 | 8/2001 |
| EP | 0871101 B1 | 10/2002 |

* cited by examiner

*Primary Examiner*—Blair M. Johnson
(74) *Attorney, Agent, or Firm*—Frommer Lawrence & Haug LLP; Ronald R. Santucci

(57) ABSTRACT

A process for initializing a motorized roller shutter that moves between two extreme positions includes moving the shutter in a first direction at fast speed, then moving it at slow speed, then reversing it in a second direction at fast speed followed by slow speed. The shutter is moved back in the first direction at fast speed, then at slow speed, after which the times are determined that are needed to cover the full travel at fast speed between the two extreme positions in the first direction and in the second direction.

15 Claims, 2 Drawing Sheets

⟶ Movement at fast speed
-------▶ Movement at slow speed

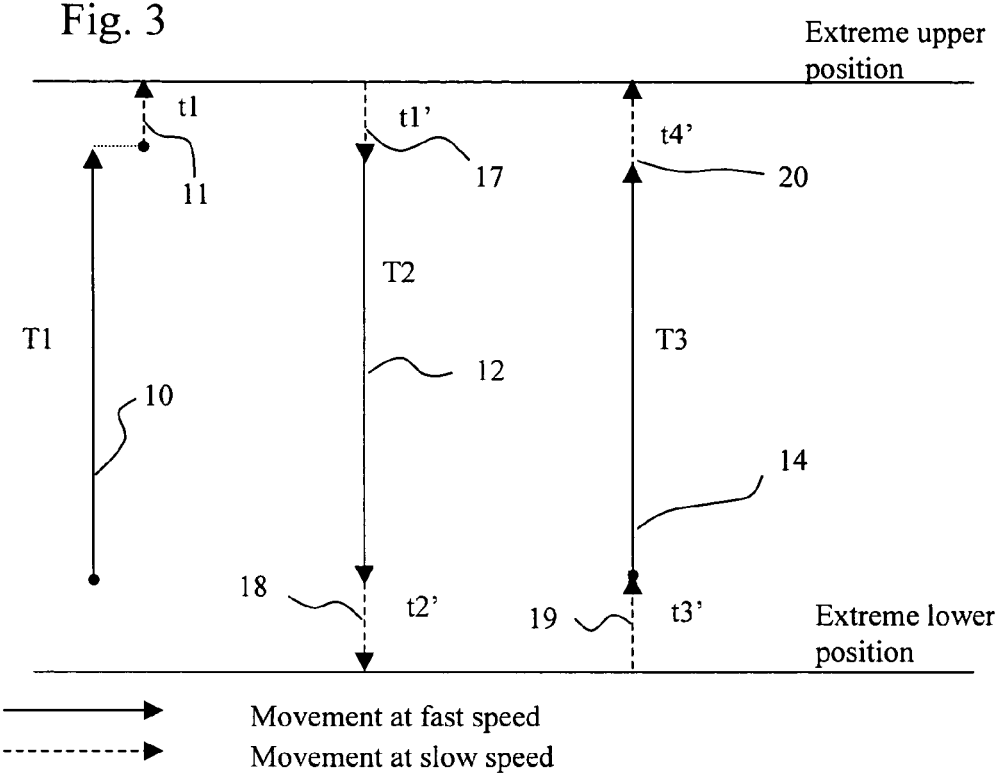
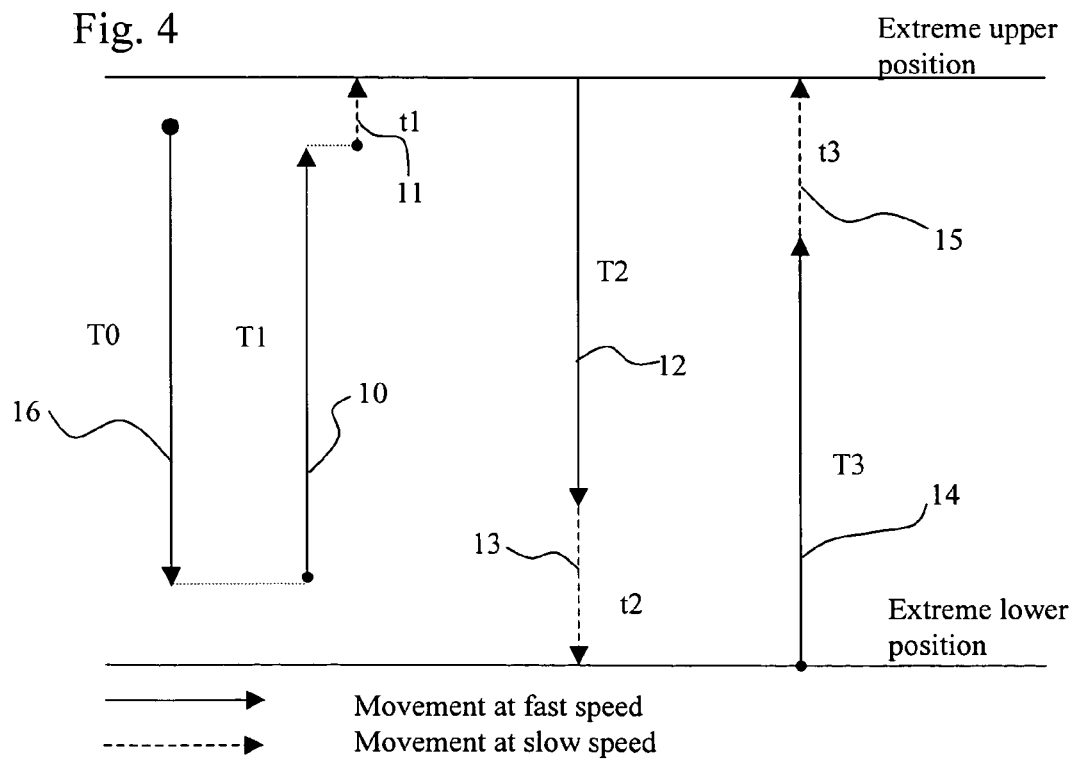

PROCESS FOR INITIALIZING A ROLLER SHUTTER

RELATED APPLICATIONS

The present application claims priority from co-pending French patent application serial no. FR 03 09991 filed on Aug. 18, 2003.

BACKGROUND OF THE INVENTION

The invention relates to a process for initializing a device comprising a screen designed to move between two extreme positions, an actuator capable of driving the screen at two different speeds, and a control unit comprising a clock that measures for how long the screen is in movement, a memory, and a logic processing unit controlling the actuator. The invention also relates to a device designed to carry out this process.

It is common practice to install roller shutters in the openings of dwellings to give protection from the sun, to provide shade and to provide security against intrusions.

Both the installation, and the control of the movement, of these roller shutters are of some complexity and require the services of a skilled person.

The aim of the installation procedures is to define and where relevant store the extreme upper and lower positions where, in operation, the roller shutter must automatically stop.

The extreme upper and lower positions, or ends of travel, may be detected for example by position sensors, by counting the position of the shutter (with a coding wheel for example), by reading the absolute value of the current, by working out the timings, or by detection of overtorque combined with an end stop.

This last solution is particularly advantageous in terms of cost, but gives rise to stresses on the roller shutter and on its kinematic drive chain.

Where ends of travel are time-controlled, the working of the roller shutter is dependent on the maximum values of the travel as stored at the initialization stage. It is therefore important that these values be accurate.

DESCRIPTION OF THE PRIOR ART

Processes for controlling the movement of a roller shutter that combine overtorque detection for the detection of ends of travel, with time-based location of the shutter are known in the prior art.

Patent EP 0 574 637, the content of which is incorporated by reference, discloses a process for controlling a roller shutter based on timing its movements. In an initialization procedure, the shutter is moved towards the first end of travel and then towards the second end of travel, the duration of the movement being measured between the two ends of travel. A re-initialization procedure is required after a defined number of movements of the shutter to avoid position drift.

This process is based on the assumption that the movement of the shutter follows a well defined relation of proportionality. However, in practice, the relation of position of shutter/duration of activation of the actuator is complex, and the proposed process does not therefore result in precise stopping at the extreme positions. This justifies the procedure for re-initialization after a defined number of shutter movements. The process has the drawback of applying large stresses to the shutter or its kinematic drive chain during the initialization procedures.

Patent application EP 1 122 404, the content of which is incorporated by reference, provides a process for controlling a roller shutter in which the shutter ascending and descending times are measured during an intialization stage by detecting overtorque when the shutter reaches an end stop. A predetermined quantity is subtracted from each of these measured times, and the result is stored in memory. Thus, the movement of the roller shutter is controlled on the basis of the activation time and in theory does not reach the upper and lower end stops. Permanent active detection of overtorque allows the detection of obstacles or excessive drift. Although the aim of the process is to reduce the opportunity for stress to occur in the shutter or in its kinematic chain, these events are still frequent, notably during the initialization and re-initialization phases.

SUMMARY OF THE INVENTION

The object of the invention is to provide a process that mitigates the problems cited and improves the known processes of the prior art. The invention proposes in particular an initialization process that minimizes the stresses acting on the shutter or its kinematic chain during the initialization or re-initialization phases.

The initialization process according to the invention comprises at least the following steps:
  moving the screen in a first direction at fast speed for a first duration such that the screen does not reach a first extreme position,
  moving the screen in the first direction at slow speed until it reaches the first extreme position,
  moving the screen in a second direction at fast speed for a second duration such that the screen does not reach the second extreme position,
  moving the screen in the second direction at slow speed until it reaches the second extreme position,
  moving the screen in the first direction at fast speed for the first duration,
  moving the screen in the first direction at slow speed until it reaches the first extreme position, and
  calculating the times needed to cover the full travel at fast speed between the two extreme positions in the first direction and in the second direction.

Various embodiments of the process are defined by the dependent claims 2 to 10.

The device for carrying out the above process comprises a screen designed to move between two extreme positions, an actuator capable of driving the screen at two different speeds, and a control unit comprising a clock that measures for how long the screen is in movement, a memory, and a logic processing unit controlling the actuator. It is characterized in that the logic processing unit comprises means of carrying out the above process.

DESCRIPTION OF THE DRAWINGS

The accompanying drawing shows, as examples, three embodiments of the initialization process according to the invention.

FIG. 3 is a diagram illustrating a second embodiment of the process according to the invention.

FIG. 4 is a diagram illustrating a third embodiment of the process according to the invention.

DESCRIPTION OF THE PREFERRED EMBODIMENTS

Figure 1:
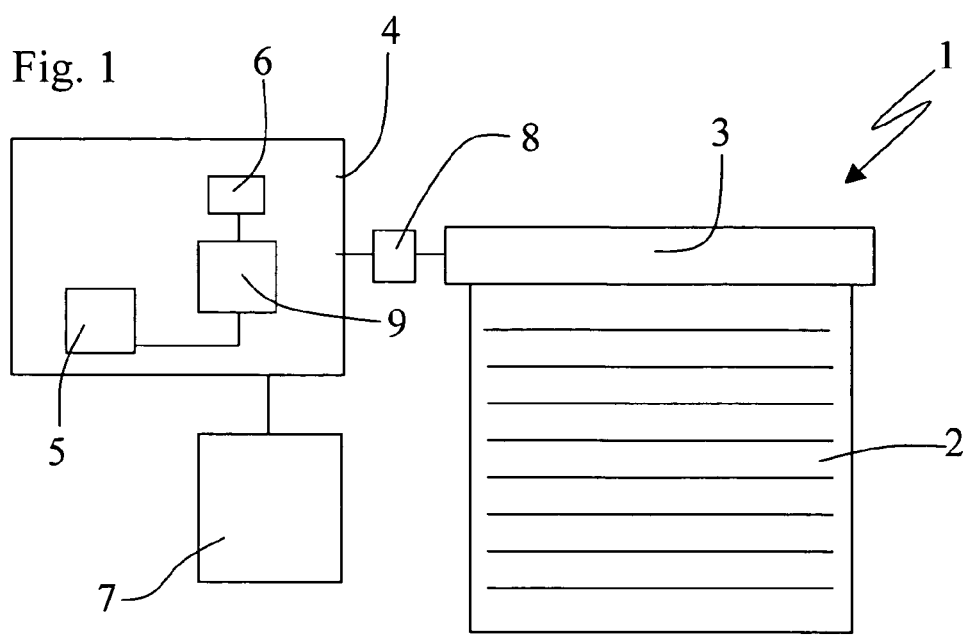
FIG. 1 is a diagram of a motorized screen device capable of carrying out the process according to the invention.

The process according to the invention applies to a motorized screen device 1 shown in FIG. 1 and comprising principally a mobile component 2 designed to be moved between two extreme positions by an electric actuator 3. The screen device 1 may consist for example of a roller shutter or a garage door.

The actuator 3 is controlled by a control unit 4 comprising a logic processing unit 9, a memory 5 and a clock 6. The actuator 3 may for example be a direct-current motor. The device also comprises end-of-travel detection means 8 working preferably by measuring the torque supplied by the actuator. A command to move the mobile component from one point to another is expressed as a duration of activation of the actuator.

Figure 2:
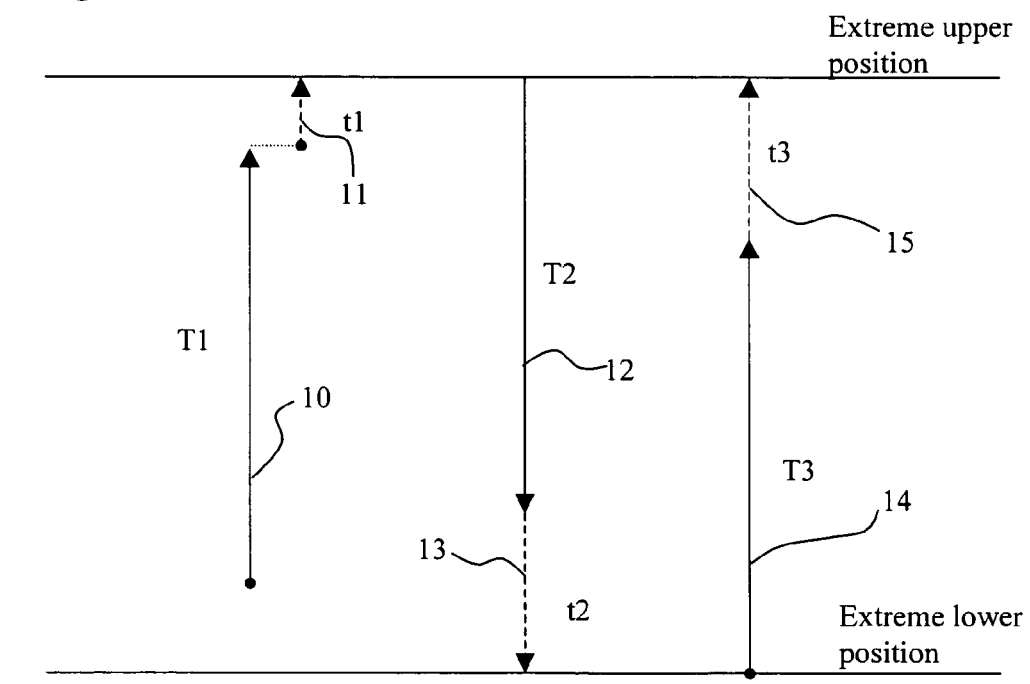
FIG. 2 is a diagram illustrating a first embodiment of the process according to the invention.

In the first embodiment of the process shown in FIG. 2, the user or the installer, having first positioned the screen in a position close to its extreme lower position, performs an action on a control transmitter or on the screen device to initiate an automatic procedure for automatic determination of the extreme upper and lower positions.

In this automatic procedure, the first step is that the actuator is actuated at fast speed $V_R$ for a duration T1 in the direction that moves the screen upwards. This duration T1 may for example be a value stored in the memory of the device and depends notably on the type of actuator, the type of screen and the length of the travel between the extreme upper and lower positions. This movement, represented by the arrow 10, terminates before the screen reaches its extreme upper position. This first step can also be done manually.

The second step is that the actuator is activated at slow speed $V_L$ in the direction that moves the screen upwards until the screen reaches its extreme upper position, in which it is in contact with an end stop. This contact is detected by the end-of-travel detection means 8. The duration t1 during which the actuator has been activated at slow speed $V_L$ is then stored in memory. This slow-speed movement $V_L$ is represented by the arrow 11.

The third step is that the actuator is activated at fast speed $V_R$ for the duration T2=α×T1 in the direction that moves the screen downwards. This duration T2 is a value deduced from the duration T1 by multiplying it by the value α. However, the duration T2 can be deduced from the duration T1 by a more complex mathematical relation. The mathematical relation may depend in particular on the type of actuator, the type of screen and the length of the travel between the extreme upper and lower positions. The relation makes it possible to allow for the difference between the speed of the screen moving down and its speed moving up, to make it certain that the end stops are not reached. For example, α could be selected in accordance with the direction of the first movement (α=0.75 where the first direction of movement is upwards or α=1 where the first direction of movement is downwards).

This movement, represented by the arrow 12, terminates before the screen reaches its extreme lower position.

The fourth step is that the actuator is activated at slow speed $V_L$ in the direction that moves the screen downwards until it reaches its extreme lower position in which it is in contact with an end stop. This contact is detected by the end-of-travel detection means 8. The duration t2 during which the actuator has been activated at slow speed $V_L$ is then stored in memory. This slow-speed movement $V_L$ is represented by the arrow 13.

The fifth step is that the actuator is activated at fast speed $V_R$ for a duration T3 in the direction that moves the screen upwards. This duration T3 is:

$$T3 = T1 + \frac{V_L}{V_R} \times t1$$

This movement, represented by the arrow 14, terminates before the screen reaches its extreme upper position.

The sixth step is that the actuator is activated at slow speed $V_L$ in the direction that moves the screen upwards until it reaches its extreme upper position in which it is in contact with an end stop. This contact is detected by the end-of-travel detection means 8. The duration t3 during which the actuator has been activated at slow speed $V_L$ is then stored in memory. This slow-speed movement $V_L$ is represented by the arrow 15.

At the end of these various steps, the ascending time $(Tasc)_R$ and descending time $(Tdesc)_R$ at fast speed $V_R$ are worked out from the following formulae:

$$(Tasc)_R = T1 + \frac{V_L}{V_R} \times t1 + \frac{V_L}{V_R} \times t3$$

$$(Tdesc)_R = \alpha \times T1 + \frac{V_L}{V_R} \times t2$$

During initialization, it is important for the calculated values to be highly accurate. This means that any variables that enter into the calculation must be eliminated as far as possible, since the relationship of proportionality between the fast speed $V_R$ and the slow speed $V_L$ is very sensitive to changes in temperature and tension.

The initialization process leads to calculations whose accuracy is greater as the first travel time T1 approaches the maximum travel time, because in this case the values measured at slow speed are small compared with the values measured at fast speed.

In the third step the actuator could also be activated for a duration that takes account of the durations T1 and t1.

Another possibility would have been to perform all the movements of the initialization process at slow speed, and then to convert the measured time values into time values corresponding to the fast speed. Besides the amount of time required to perform such a procedure, a slow speed means underpowering the motor and the consequent risk that insufficient torque may be provided to lift the screen when the screen comes to its position of maximum load. The fact that the screen has stopped could then be interpreted as its having reached an end stop and initialization would be based on erroneous travel times.

In a second embodiment shown in FIG. 3, another possibility would be to precede the fast-speed movement (represented by the arrow 12) with a slow-speed movement lasting a duration t1'=α×t2' (represented by the arrow 17).

The duration t2' measured during the slow-speed movement represented by the arrow 18 therefore allows for the slow-speed movement represented by the arrow 17.

Similarly, the movement in the following direction can be begun by a slow-speed movement represented by the arrow 19, lasting a duration equal to $$t3' = \frac{t2'}{\alpha}.$$

The duration t4' measured during the slow-speed movement of the screen represented by the arrow 20 likewise allows for the slow-speed movement represented by the arrow 19.

The ascending time $(Tasc)_R$ and descending time $(Tdesc)_R$ at fast speed $V_R$ are then worked out from the following formulae:

$$(Tasc)_R = T1 + \frac{V_L}{V_R} \times t1 + \frac{V_L}{V_R} \times \left(\frac{t2'}{\alpha} + t3'\right)$$

$$(Tdesc)_R = \alpha \times T1 + \frac{V_L}{V_R} \times (t1' + t2')$$

A third embodiment of the process, shown in FIG. 4, differs from the first embodiment described above in that it comprises a preceding step performed after the user or installer has set the screen in a position close to its extreme upper position. This preceding step is an activation of the actuator at fast speed in the descent direction of the screen for the duration T0 such that the screen does not reach its extreme lower position. This movement is represented by an arrow 16. The movement is performed manually under the control of the user or installer.

$$T1 = \frac{T0}{\alpha} \text{ and } T2 = T0.$$

The movements of steps 1 to 6 described in the first embodiment are then executed automatically one after the other. The command initiating the operation following the movement represented by the arrow 16, is a command to move in the opposite direction to the last movement of the screen. This command triggers the automatic initialization. The whole procedure then proceeds without the intervention of the user.

This last embodiment may also repeat the steps described in the second embodiment.

Naturally, all the operations can be accomplished in the opposite direction to that described and illustrated in the figures.

What is claimed is:

1. A process for initializing a device (1) comprising a screen (2) designed to move between two extreme positions, an actuator (3) capable of driving the screen at two different speeds, and a control unit (4) comprising a clock (6) that measures for how long the screen is in movement, a memory (5), and a logic processing unit (9) controlling the actuator, which process comprises at least the following steps: moving the screen in a first direction at fast speed for a fast speed first duration (T1) such that the screen does not reach a first extreme position, moving the screen in the first direction at slow speed until it reaches the first extreme position, and record this duration as slow speed first duration (t1), moving the screen in a second direction at fast speed for a fast speed second duration (T2) such that the screen does not reach the second extreme position, moving the screen in the second direction at slow speed until it reaches the second extreme position and record this duration as slow speed second duration (t2), moving the screen in the first direction at fast speed for the fast speed first duration (T1), moving the screen in the first direction at slow speed until it reaches the first extreme position and record this duration as slow speed third duration (t3), and calculating the times needed to cover the full travel at fast speed between the two extreme positions in the first direction and in the second direction using the first and second fast speed durations (T1, T2) and the recorded slow speed first, second, and third durations (t1, t2, t3), wherein the control unit (4) determines a screen position based on a duration of activation of the actuator.

2. The initialization process as claimed in claim 1, which includes, before the various steps, moving the screen in the second direction at fast speed for a duration such that the screen does not reach the second extreme position.

3. The initialization process as claimed in claim 1, in which the duration of the second fast-speed movement is deduced from the duration of the first fast-speed movement by a mathematical relation.

4. The initialization process as claimed in claim 1, in which the first movement is performed under the of an operator.

5. The initialization process as claimed in claim 1, in which the first movement is controlled by a dead-man type of manual action.

6. The initialization process as claimed in claim 4, in which the subsequent movements are performed automatically.

7. The initialization process as claimed in claim 5, in which the subsequent movements are performed automatically.

8. The initialization process as claimed in claim 6, in which the automatic movements are initiated by a command to start the screen moving.

9. The initialization process as claimed in claim 7, in which the automatic movements are initiated by a command to start the screen moving.

10. The initialization process as claimed in claim 6, in which the automatic movements are initiated by a specific command.

11. The initialization process as claimed in claim 7, in which the automatic movements are initiated by a specific command.

12. The initialization process as claimed in claim 1, in which the extreme positions are detected by measuring an overtorque of the actuator.

13. The initialization process as claimed in claim 1, in which the first movement of the screen is approximately as long as the travel of the screen.

14. A device (1) comprising a screen (2) designed to move between two extreme positions, an actuator (3) capable of driving the screen (2) at two different speeds, and a control unit (4) comprising a clock (6) that measures for how long the screen is in movement, a memory (5), and a logic processing unit (9) controlling the actuator, wherein the logic processing unit (9) executes logic comprising: moving the screen in a first direction at fast speed for a fast speed first duration (T1) such that the screen does not reach a first extreme position, moving the screen in the first direction at slow speed until it reaches the first extreme position and record this duration as slow speed first duration (t1), moving the screen in a second direction at fast speed for a fast speed second duration (T2) such that the screen does not reach the second extreme position, moving the screen in the second direction at slow speed until it reaches the second extreme position and record this duration as slow speed second duration (t2), moving the screen in the first direction at fast speed for the fast speed first duration (T1), moving the screen in the first direction at slow speed until it reaches the first extreme position and record this as slow speed third duration (t3), and calculating the times needed to cover the full travel at fast speed between the two extreme positions in the first direction and in the second direction using the first and second fast speed durations (T1, T2) and the recorded slow speed first, second, and third durations (t1, t2, t3), wherein the control unit (4) determines a screen position based on a duration of activation of the actuator.

15. A process for initializing time-controlled extreme positions of a device (1) comprising a screen (2) designed to move between two extreme positions, an actuator (3) capable of driving the screen at two different speeds, and a control unit (4) comprising a clock (6) that measures for how long the screen is in movement, a memory (5), and a logic processing unit (9) controlling the actuator, which process comprises at least the following steps: moving the screen in a first direction at fast speed for a first duration such that the screen does not reach a first extreme position, moving the screen in the first direction at slow speed until it reaches the first extreme position, moving the screen in a second direction at fast speed for a second duration such that the screen does not reach the second extreme position, moving the screen in the second direction at slow speed until it reaches the second extreme position, moving the screen in the first direction at fast speed for the first duration, moving the screen in the first direction at slow speed until it reaches the first extreme position, and using data from these movements of the screen to calculate the times needed to cover the full travel at fast speed between the two extreme positions in the first direction and in the second direction, wherein the control unit (4) determines a screen position based on a duration of activation of the actuator.

* * * * *